US008576447B2

(12) United States Patent
Damera-Venkata

(10) Patent No.: US 8,576,447 B2
(45) Date of Patent: Nov. 5, 2013

(54) ERROR DIFFUSION HALFTONING WITH BANDPASS NOISE SHAPING

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3117 days.

(21) Appl. No.: 10/698,895

(22) Filed: Oct. 31, 2003

(65) Prior Publication Data

US 2005/0094210 A1    May 5, 2005

(51) Int. Cl.
*H04N 1/405* (2006.01)
*G06K 15/00* (2006.01)

(52) U.S. Cl.
USPC ......... 358/3.03; 358/3.04; 358/3.05; 358/1.9; 358/3.01; 358/447; 382/252; 382/237; 382/270

(58) Field of Classification Search
USPC ............. 358/3.03, 3.01, 1.9, 3.04, 3.05, 447; 382/252, 237, 270
See application file for complete search history.

(56) References Cited

U.S. PATENT DOCUMENTS

| 5,055,942 | A | 10/1991 | Levien |
| 5,331,429 | A | 7/1994 | Levien |
| 6,181,827 | B1 | 1/2001 | Kishimoto |
| 6,510,252 | B1 | 1/2003 | Kishimoto |
| 6,552,822 | B1 * | 4/2003 | Kishimoto .................. 358/3.03 |
| 6,999,201 | B1 * | 2/2006 | Shimizu ..................... 358/3.04 |
| 2003/0038953 | A1 | 2/2003 | Damera-Venkata |

FOREIGN PATENT DOCUMENTS

EP    0500267    8/1992

OTHER PUBLICATIONS

Niranjan Damera—Venkata and Brian L. Evan, Color Error Diffusion With Generalized Optimum Noise Shaping, Published 2001 IEEE, pp. 1073-1076.*
On the Phase Response of the Error Diffusion Filter for Image Halftoning, ☐☐Akhil Kumar and Anamitra Makur.*
The Authoritative Dictionary of IEEE Standards Terms 435 (7th ed. 2000).*
N Damera-Venkata et al—"Adaptive Threshold Modulation for Error Diffusion Halftoning"—IEEE Transactions on Image Processing—vol. 10 No. 1—Jan. 2001.
Damera-Venkata et al., "Adaptive threshold modulation for error diffusion halftoning" IEEE Transactions on image processing, vol. 10, No. 1, pp. 104-116 (Jan. 2001).
Damera-Venkata et al., "Design and analysis of vector color error diffusion halftoning systems" IEEE Transactions on image processing, vol. 10, No. 10, pp. 1552-1565 (Oct. 2001).

* cited by examiner

*Primary Examiner* — Steven Kau
*Assistant Examiner* — Quang N Vo

(57) ABSTRACT

Error diffusion halftoning includes using a quantizer having an input and an output; and using a system having a bandpass characteristic to modify the quantizer input without feeding the quantizer output directly into the quantizer input. The error diffusion halftoning can produce clustered pixel halftone patterns that can be reliably reproduced by laser printers and other electro-photographic devices.

4 Claims, 5 Drawing Sheets

ERROR DIFFUSION HALFTONING WITH BANDPASS NOISE SHAPING

BACKGROUND

Halftoning is performed to render continuous tone digital grayscale and color images into patterns of pixels that can be displayed on bi-level devices such as printers. The rendered images are commonly referred to as halftone images. The pixels are arranged in patterns such that a halftone image creates the illusion of continuous tones.

The halftone images may contain halftone patterns composed of isolated pixels. However, isolated pixels are not reliably reproduced by laser printers and other electro-photographic devices.

The halftone images may contain clusters of pixels. The pattern power spectra of the clustered pixels exhibits a strong mid-frequency component, as opposed to the strong high frequency component exhibited by the isolated pixel halftone patterns. Clustered pixels can be reliably reproduced by laser printers.

Error diffusion halftoning is a high quality method of rendering continuous tone images. The high quality is achieved by non-linear feedback. Quantization errors a refiltered using an error filter, and the filtered errors are fed back to the input in order to shape the quantization noise into high frequency regions, which are less perceptible to the human visual system. As a result, the error diffusion halftoning can produce dot patterns that are visually pleasing.

It can be advantageous to use the error diffusion halftoning to produce clustered pixel halftone patterns. Such halftoning can produce patterns that are robust to printer distortions due to the poor isolated pixel reproduction by laser printers and other electro-photographic devices.

SUMMARY

According to one aspect of the present invention, error diffusion halftoning includes using a quantizer having an input and an output; and using a system having a bandpass characteristic to modify the quantizer input without feeding the quantizer output directly into the quantizer input. The error diffusion halftoning can produce clustered pixel halftone patterns that can be reliably reproduced by laser printers and other electro-photographic devices.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 1b and 1c are models of the system of FIG. 1a.

DETAILED DESCRIPTION

The present invention is embodied in a method of performing clustered pixel error diffusion halftoning on a continuous tone (contone) image. The contone image is represented by a plurality of pixel values. Each pixel value contains n-bits, where n>1. If n=8, for example, the pixel has 256 possible values. The error diffusion halftoning transforms the contone image to a halftone image. Each pixel value of the halftone image contains a single bit (e.g., 1=a pixel; 0=no pixel). The halftone image contains patterns of these 1-bit pixel values, which create the illusion of a full range of tones.

Figure 1A:
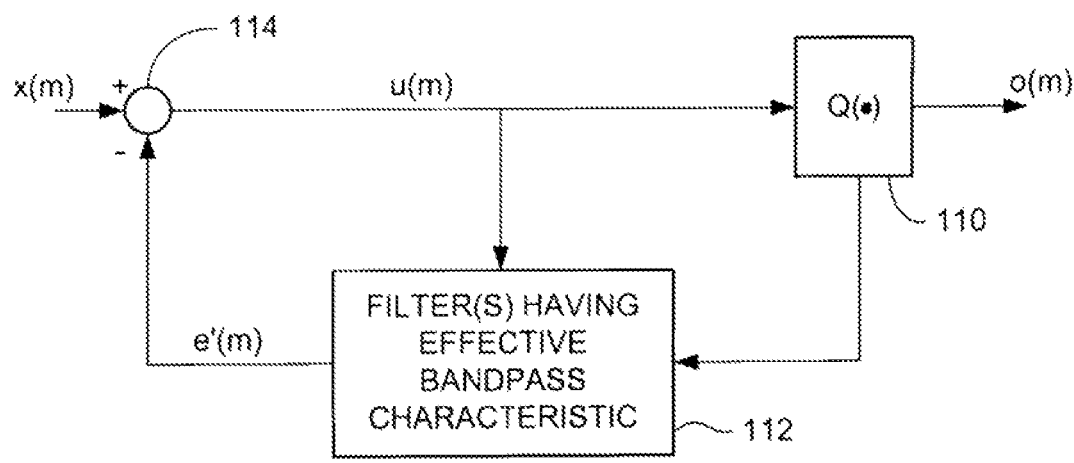
FIG. 1a is an illustration of an error diffusion halftoning system according to an embodiment of the present invention.

Reference is made to FIG. 1a, which illustrates a clustered pixel error diffusion halftoning system 100. The system 100 receives a raw input signal represented by x(m), where m is a 2-D vector of pixel coordinates (m1, m2), and x(m) represents a grayscale value of pixel of a contone image at coordinates m1, m2. The pixels of the contone image may be provided serially, by scanning the contone image in a serpentine order. Each pixel in the contone image may be processed as follows.

The raw input signal x(m) is modified by a filtered error signal e'(m). The modified input signal u(m) is supplied to a quantizer 110. The quantizer 110 outputs either a 1 or a 0, depending on whether the modified signal u(m) is greater than a threshold. For example, $$o(m) = \begin{cases} 1 & u(m) > T \\ 0 & \text{else} \end{cases}$$

where o(m) represents the output signal of the quantizer 110, and T represent the threshold.

The filtered error signal e'(m) is produced by one or more filters 112, which collectively have an effective bandpass transfer function. The filtered error signal e'(m) modifies the quantizer input at 114.

Figure 1B:
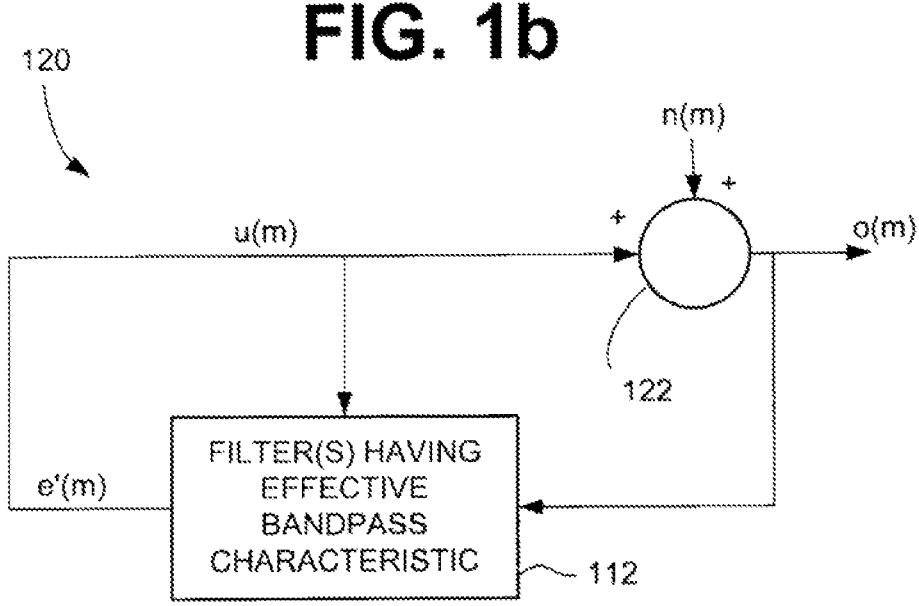

FIG. 1b illustrates a model 120 of the system 100 (FIG. 1b does not illustrate an embodiment of the present invention). Assume no input image is present, and the quantizer 110 is replaced by a source 122 of uncorrelated noise n(m). The noise source 122 injects the uncorrelated noise n(m) into the model 120. The model 120 of FIG. 1b is linear.

Figure 1C:
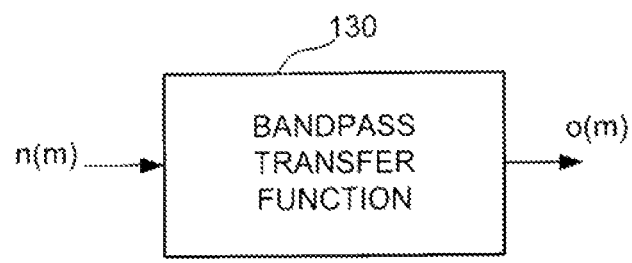

Additional reference is made to FIG. 1c, which illustrates the response of the model 120. A transfer function 130 between the quantizer output and the noise injection (freq response of output/freq. response of noise injection) has a bandpass characteristic. The bandpass characteristic causes the noise n(m) to shift from high frequency to a mid-range frequency to promote pixel clustering.

The following noise transfer function may be used.

$$1 - B(z) = \frac{1 - H(z)}{1 - \alpha H(z) + \alpha H(z)K(z)}$$

where H(z) and K(z) are transfer functions that contribute to an "effective" bandpass transfer function, and α is a scalar. The transfer functions H(z) and K(z) may be, for example, low pass transfer functions that contribute to the effective bandpass transfer function.

B(z) is the bandpass transfer function, which is characterized by a mid frequency peak in its magnitude response, surrounded by regions of relatively low magnitude response. The bandpass transfer function may have the following form:

$$B(z) = \frac{(1-\alpha)H(z) + \alpha H(z)K(z)}{1 - \alpha H(z) + \alpha H(z)K(z)}.$$

Consider an example in which Floyd-Steinberg weights are used for the transfer function H(z), and two equal weights of 0.5 are used in the vertical and horizontal directions for the transfer function K(z). The transfer functions H(z) and K(z) become $$H(z_h, z_v) = \frac{7}{16}z_h^{-1} + \frac{1}{16}z_h^{-1}z_v^{-1} + \frac{5}{16}z_v^{-1} + \frac{3}{16}z_h^{-1}z_v^{-1}$$

$$K(z_h, z_v) = \frac{1}{2}z_h^{-1} + \frac{1}{2}z_v^{-1}$$

where subscripts h an v denote the horizontal and vertical directions.

In the example above, the transfer function K(z) does not favor one direction over the other. Generally, it is preferable for the transfer function K(z) to not favor one direction over the other. However, the transfer function K(z) is not so limited. The human visual system is directional. Classic filters such as the four coefficient Floyd-Steinberg filter could be used as well. The optimal filters may be generated by minimizing a human visual system cost function.

The noise shaping behavior of the system 100 can be made mean-preserving by having the coefficients of the transfer functions H(z) and K(z) sum to unity at dc. The clustered pixels can be moved closer together or spaced farther apart to maintain an average color and thereby avoid tone shifts.

The scalar α is a tunable parameter that can be varied to adjust the coarseness of the pixel clustering. Increasing the amount of noise in the bandpass region increases the amount of pixel clustering. The scalar α may have a value 0≤α≤1. The mid-frequency of the noise is increased as the scalar α increases. When α=0, pixel clustering does not occur, whereby isolated pixels can appear in the output image. When α=1, the maximum amount of pixel clustering occurs in the output image. When α=0.5, mid-frequency noise is boosted, and low frequency noise is attenuated.

Figure 5A:
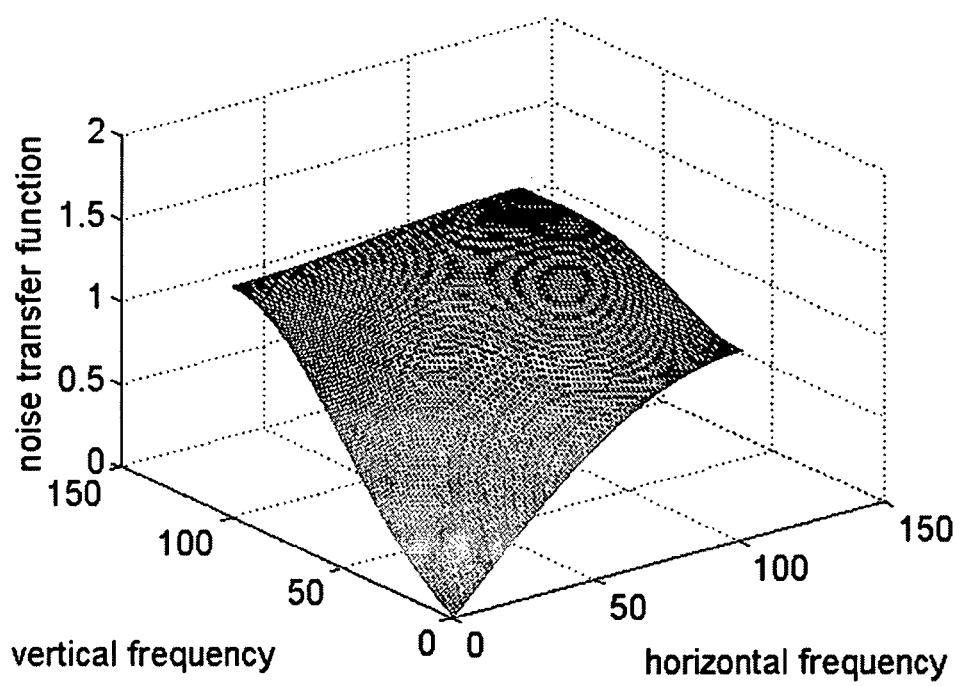
FIGS. 5a-5c are illustrations of noise transfer functions in accordance with an embodiment of the present invention.
Figure 5B:
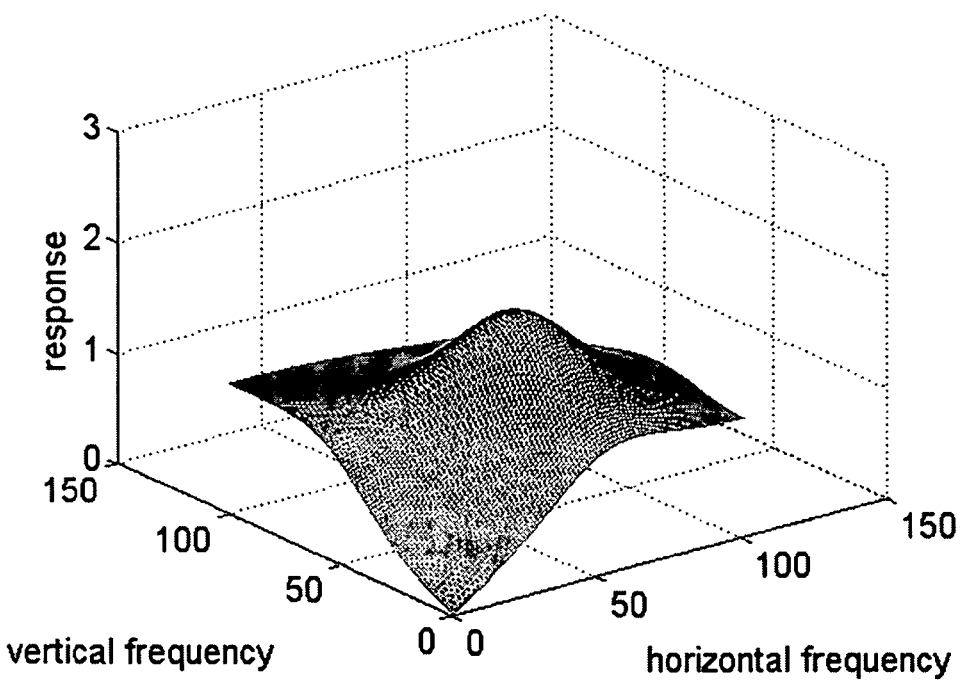
Figure 5C:
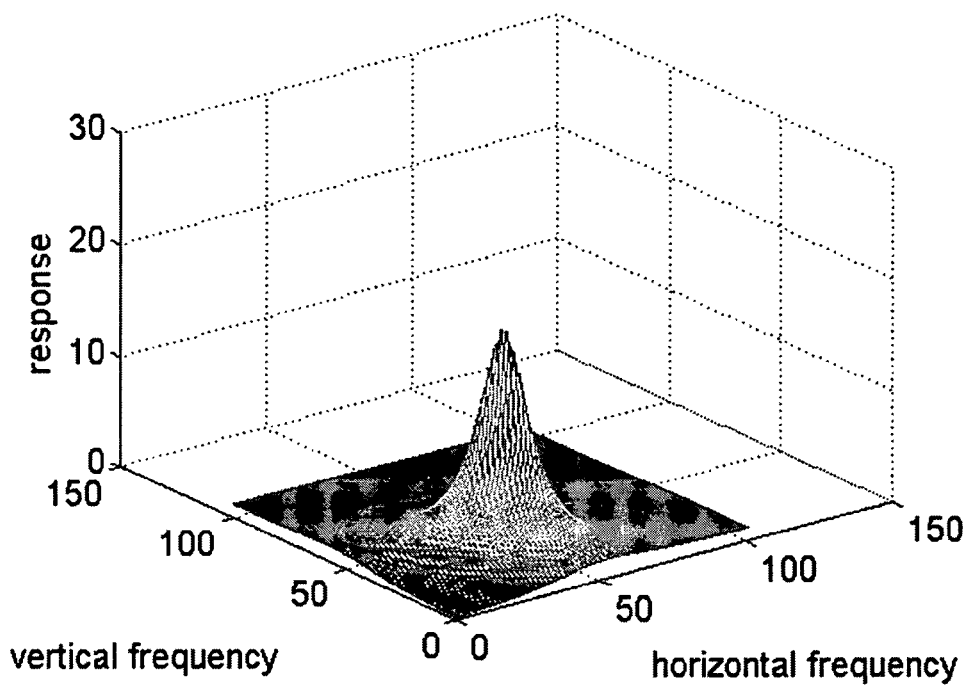
Figure 6:
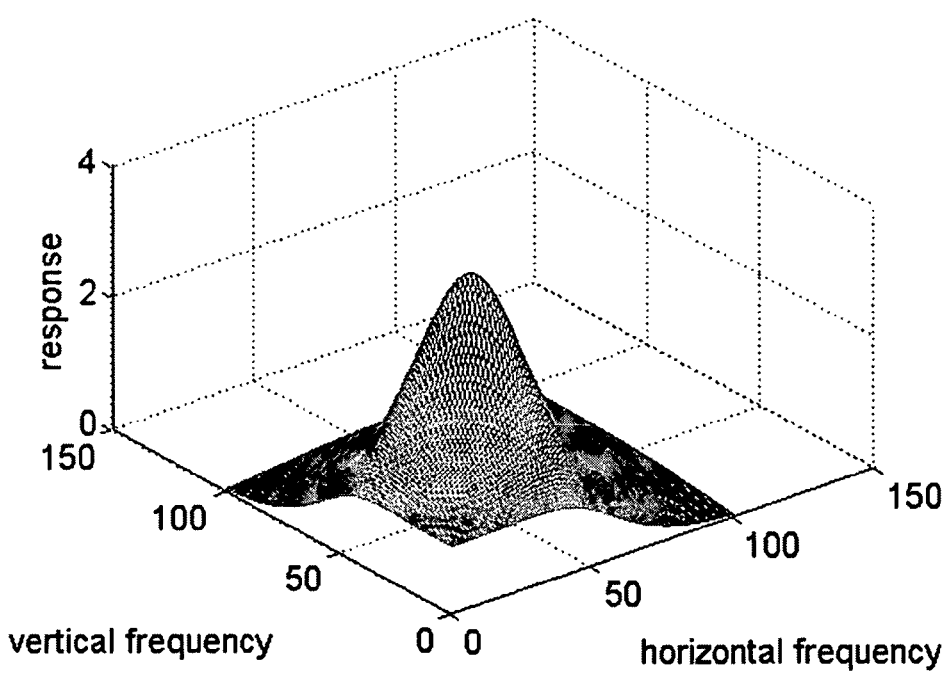
FIG. 6 is an illustration of a bandpass transfer function in accordance with an embodiment of the present invention.

An exemplary noise transfer function is illustrated in FIGS. 5a-5c. FIG. 5a illustrates the transfer function for α=0, FIG. 5b illustrates the transfer function for α=0.5, and FIG. 5c illustrates the transfer function for α=1. The mid-frequency range increases as the value of a increases. An exemplary bandpass transfer function is illustrated in FIG. 6.

The pixel clustering can be tuned to suit the needs of a variety of applications. The scalar α may be adjusted on a pixel-by-pixel basis, on an image-by-image basis, periodically, or at other times. See N. Damera-Venkata and B. L. Evans, "Adaptive Threshold Modulation for Error Diffusion Halftoning", IEEE Transactions on Image Processing, vol. 10, no. 1, pp 104-116 (January 2001) as an example of how the scalar α may be varied on a per-pixel basis. The scalar may be adjusted automatically or by manual input.

The error diffusion halftoning system 100 does not feed the quantizer output signal directly into the quantizer input. For instance, the system 100 does not use the quantizer output to bias the quantizer input. As a benefit, the range of inputs to the quantizer 110 is not increased, and quantizer overloading is avoided The error diffusion halftoning system 100 is simple to implement and, due to image adaptivity, it offers higher quality halftoning than can be achieved by clustered pixel screens. The clustered pixel halftone patterns are robust to printer distortions due to the poor isolated pixel reproduction by laser printers and other electro-photographic devices. The pixel clusters do not give a regular ordered pattern, but the pattern is aperiodic and, therefore, does not interfere with the picture (e.g., Moire effects). Finer lines can be reproduced better, and the quantizer noise is perceived as film grain.

The error diffusion halftoning system 100 can be implemented with any filter or a combination of filters that give the system 100 a bandpass characteristic. For example, the system 100 can be implemented with a pair of 2D non-separable finite impulse response (FIR) filters, or with a single infinite impulse response (IIR) filter, or with a single bandpass FIR filter instead of a single IIR filter. Two of these implementations will now be described.

Figure 2:
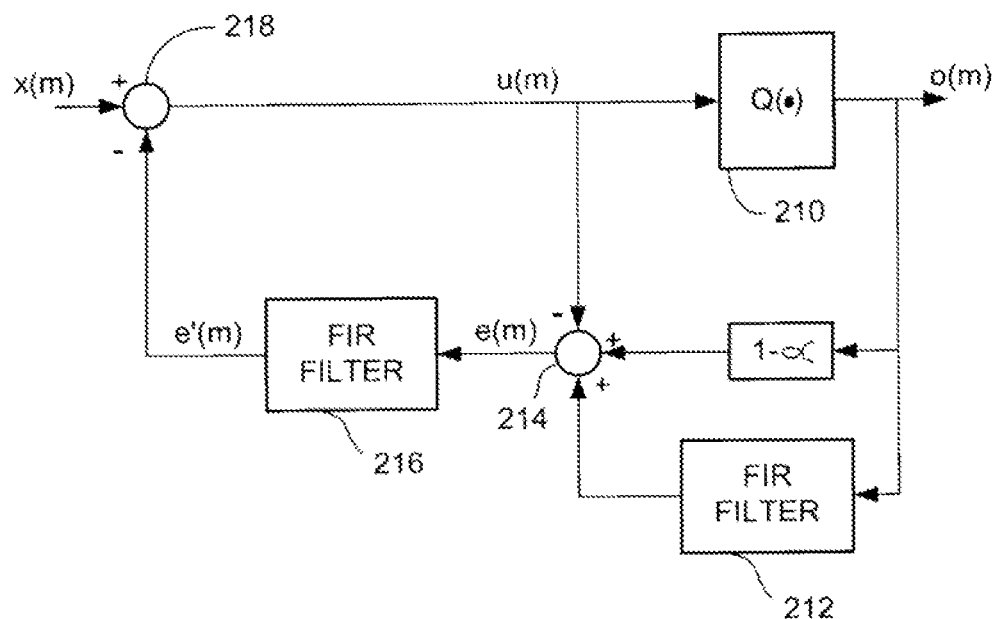
FIG. 2 is an illustration of an error diffusion halftoning system according to an embodiment of the present invention.

Reference is now made to FIG. 2, which illustrates an example of performing error diffusion halftoning with a pair of 2-D non-separable low-pass FIR filters 212 and 216. The output signal o(m) of the quantizer 210 is supplied to the first FIR filter 212, which applies the transfer function αK(z). In doing so, the first FIR filter 212 multiplies the current and previous quantizer outputs by weights. An output of the first FIR filter 212 is summed with the product (1−α)o(m), and the quantizer input signal u(m) is subtracted from the sum at 214 to produce the error signal e(m). Thus, $$e(m) = (1-\alpha)o(m) + \alpha \sum_{k \in o} k(k)o(m-k) - u(m).$$

The second FIR filter 216 applies the transfer function H(z) to the error signal e(m). In doing so, the second FIR filter 216 multiplies the current and previous quantizer outputs by weights. An output of the second FIR filter 216 provides the modified error signal e'(m), which is added to the quantizer input at 218. Thus $$u(m) = x(m) - \sum_{k \in C} h(k)e(m-k).$$

Figure 3:
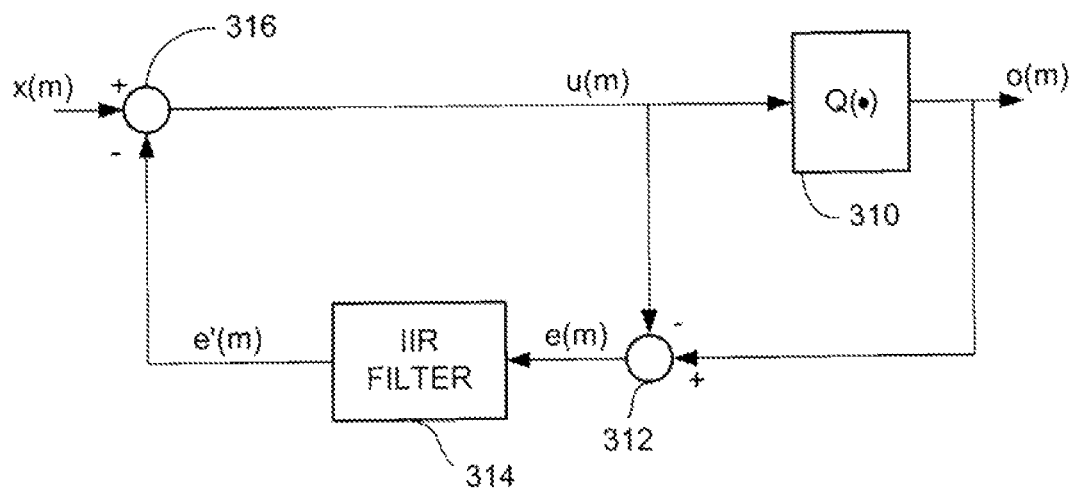
FIG. 3 is an illustration of an error diffusion halftoning system according to an embodiment of the present invention.

Reference is now made to FIG. 3, which illustrates an example performing error diffusion halftoning with a quantizer 310 and a single 2-D non-separable IIR filter 314. An error signal e(m) is produced at 312 from the quantizer input signal u(m) and the quantizer output signal o(m). Thus e(m)=o(m)−u(m). The IIR filter 314 applies the bandpass transfer function to the error signal e(m). In doing so, the IIR filter 314 current takes a weighted sum of the current and previous errors e(m), and its current and previous outputs e'(m). In this example, direct filtering of the quantizer output signal o(m) is not performed.

The clustered pixel error diffusion halftoning is not limited to grayscale contone images; it can be performed on full color images. For example, a 24-bit pixel value devotes 8-bits to a red color component, 8 bits to a green color component, and 8 bits to a blue color component. Thus each color component has a range of 256 values. The halftones could be extended by using a color smooth quantizer described in U.S. Patent Publication Ser. No. 2003/0038953 published Feb. 27, 2003.

The clustered pixel error diffusion halftoning is not limited to any particular hardware implementation. An exemplary implementation is illustrated in FIG. 4.

Figure 4:
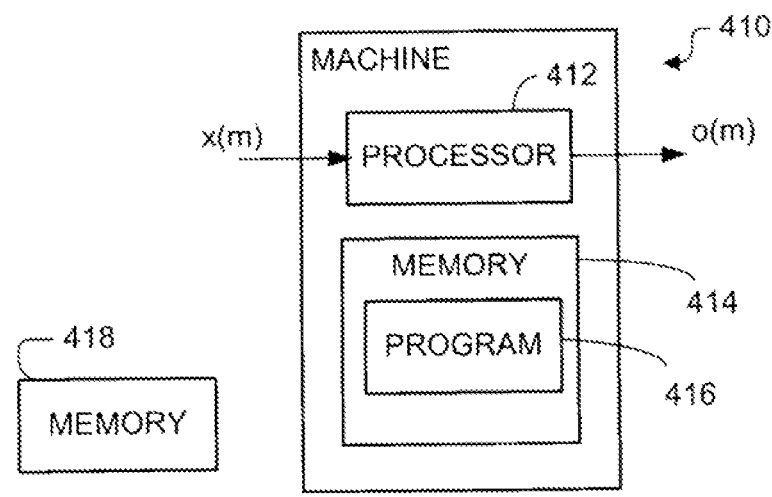
FIG. 4 is an illustration of an apparatus for performing error diffusion halftoning according to an embodiment of the present invention.

Referring to FIG. 4, a machine 410 includes a processor 412 and memory 414. The processor 412 can be a digital signal processor (DSP), which implements a single IIR filter or a pair of FIR filters. The memory 414 stores the weights for taps of the filter(s) and a program 416 for instructing the processor 412 to perform the error diffusion halftoning described above. The input signal can be supplied by an external source. In the alternative, the processor 412 can be a general purpose processor that is programmed to perform the error diffusion halftoning described above. During execution, the program 416 can be stored in "articles" such as the memory 414. During distribution, the program 416 can be stored in articles such as external storage devices, removable media (e.g., optical discs), etc.

The machine 410 can be an electro-photographic device, such as a laserjet printer or all-in-one machine. The processor 412 may be part of the machine's controller. In the alternative, the machine 410 could be a personal computer, which generates a halftone image and then stores, or transmits the halftone image to a printer for display.

In color laserjet printers, for example, the illusion of continuous shades of color is produced by superimposing the halftones of the individual colorants used, e.g., cyan, magenta, yellow and black (CYMK). Since pixels are clustered, they are reliably reproduced by the laser printer.

Although several specific embodiments of the present invention have been described and illustrated, the present invention is not limited to the specific forms or arrangements of parts so described and illustrated. Instead, the present invention is construed according to the following claims.

The invention claimed is:

1. An error diffusion halftoning method comprising operating a processor to perform operations comprising:
    modifying a current input to produce a modified input, wherein the modifying comprises incorporating past quantization errors into the current input;
    quantizing the modified input to produce an output; and
    processing the output through a data processing path having a bandpass transfer characteristic, wherein the processing comprises deriving an error value from the modified input and the output and diffusing the error value into future inputs, wherein the processing comprises low-pass filtering the output with a first linear weighting filter, generating a second error value based on the filtered output and the modified input, and low pass filtering the second error value with a second linear weighting filter to produce the first error value.

2. Apparatus for performing error diffusion halftoning, the apparatus comprising a processor operable to perform operations comprising:
    modifying a current input to produce a modified input, wherein the modifying comprises incorporating past quantization errors into the current input;
    quantizing the modified input to produce an output; and
    processing the output through a data processing path having a bandpass transfer characteristic, wherein the processing comprises deriving an error value from the modified input and the output and diffusing the error value into future inputs, wherein processing comprises low pass filtering the output with a first linear weighting filter, generating a second error value based on the filtered output value and the modified input, and low-pass filtering the second error value with a second linear weighting filter to produce the first error value.

3. A machine-readable memory storing processor-readable instructions that, when executed by processor, causes the processor to perform error diffusion halftoning, the error diffusion halftoning including performing quantization, and filtering with an effective bandpass characteristic without using an output of the quantization to directly influence an input of the quantization, wherein the processor-readable instructions cause the processor to perform operations comprising: low pass filtering the quantization output with a first linear weighting filter; generating an error signal from the filtered output signal and the quantization input; and low pass filtering the error signal with a second linear weighting filter.

4. An error diffusion halftoning method comprising operating a processor to perform operations comprising:
    modifying a current input to produce a modified input, wherein the modifying comprises incorporating past quantization errors into the current input;
    quantizing the modified input to produce an output; and
    processing the output through a data processing path having a bandpass transfer characteristic, wherein the processing comprises deriving an error value from the modified input and the output and diffusing the error value into future inputs;
wherein:
    the processing comprises
        modifying the output to produce a modified output, wherein the modifying of the output comprises filtering past errors in accordance with a first low-pass filter transfer function and incorporating into the modified output the past errors filtered in accordance with the first low-pass filter transfer function,
        subtracting the modified input from the modified output to produce a second error value, and
        filtering the second error value in accordance with a second low-pass filter transfer function to produce the first error value; and
    the modifying comprises incorporating into the current input past error values filtered in accordance with the second low-pass filter transfer function to produce the modified input.

* * * * *